UNITED STATES PATENT OFFICE.

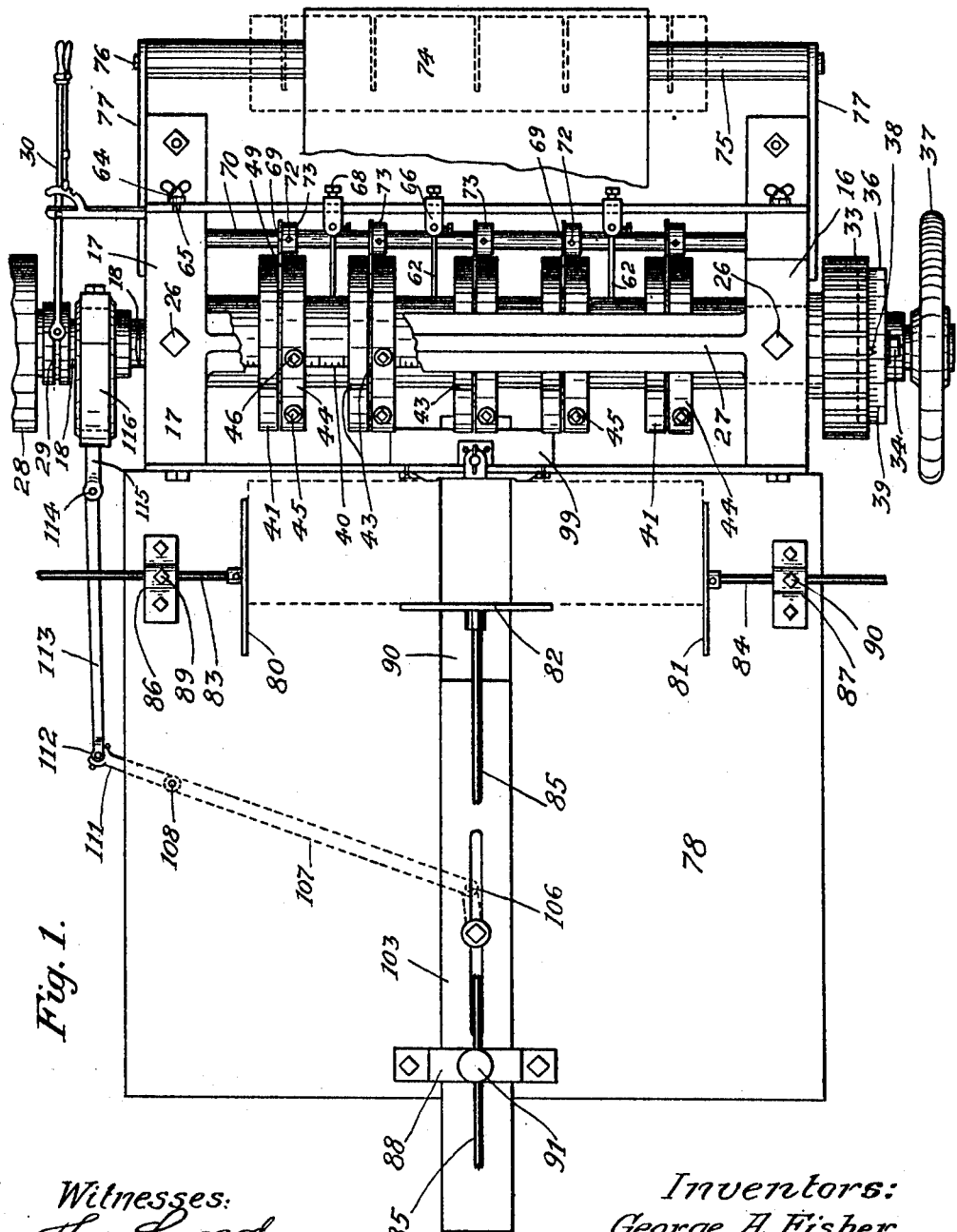

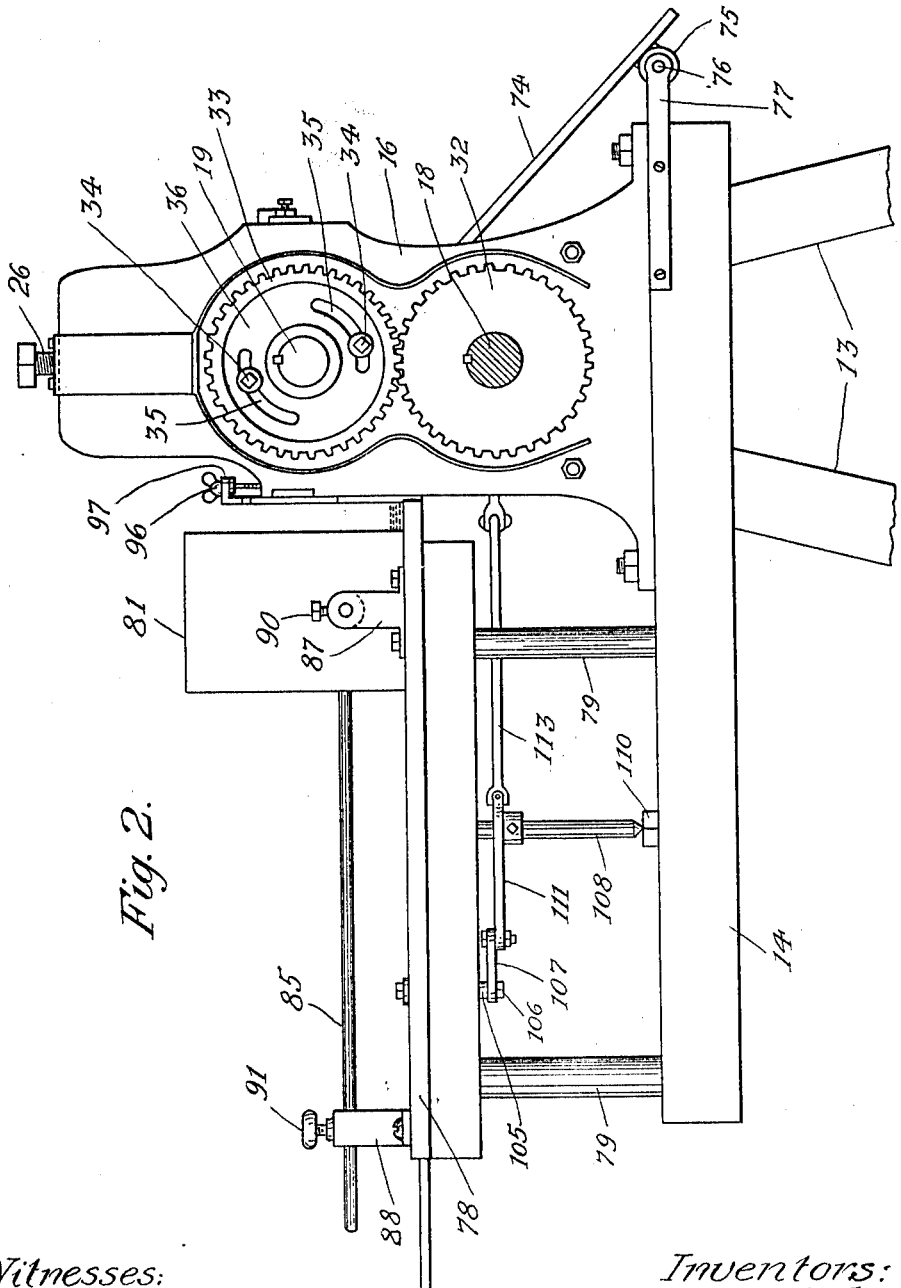

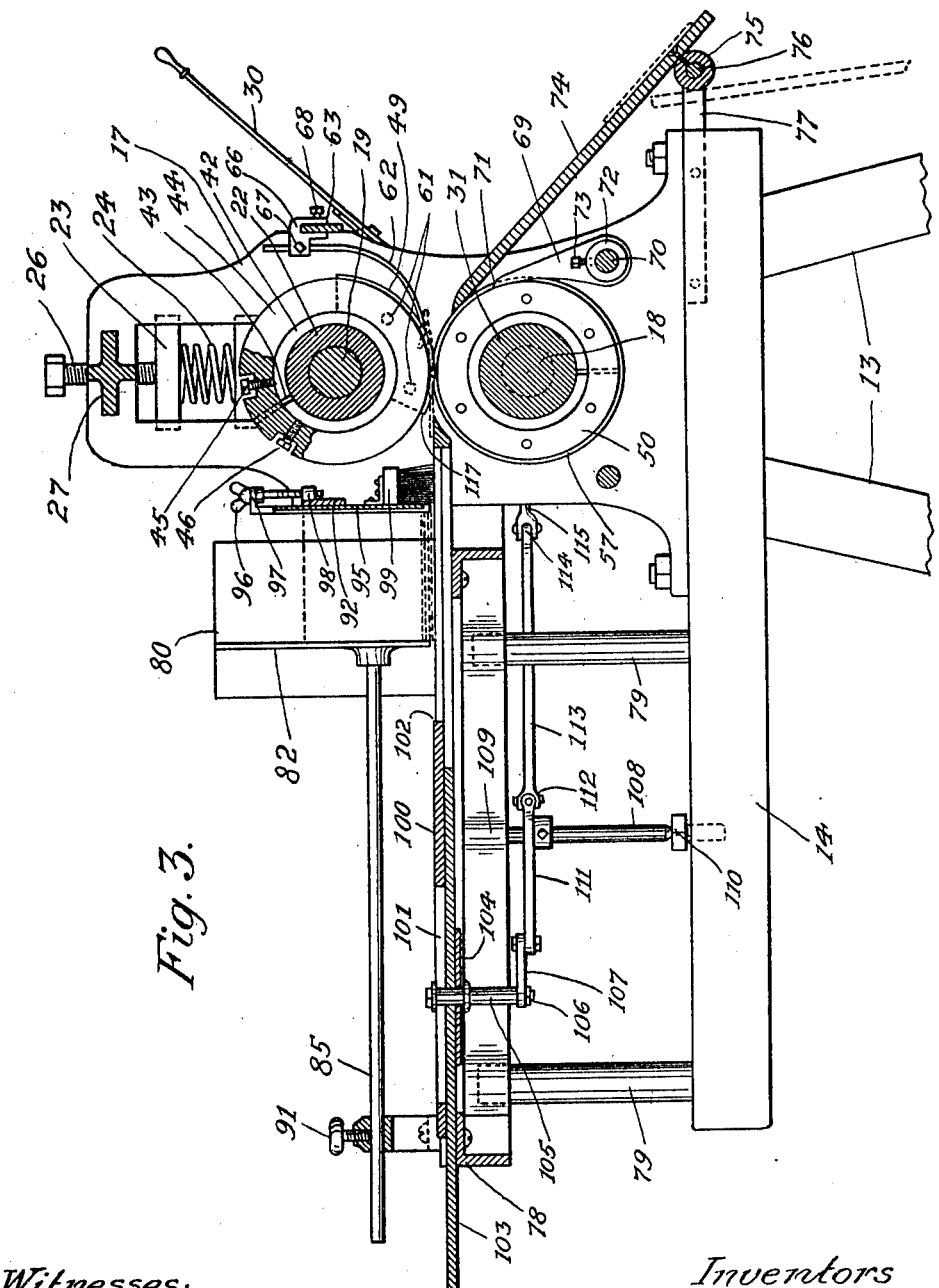

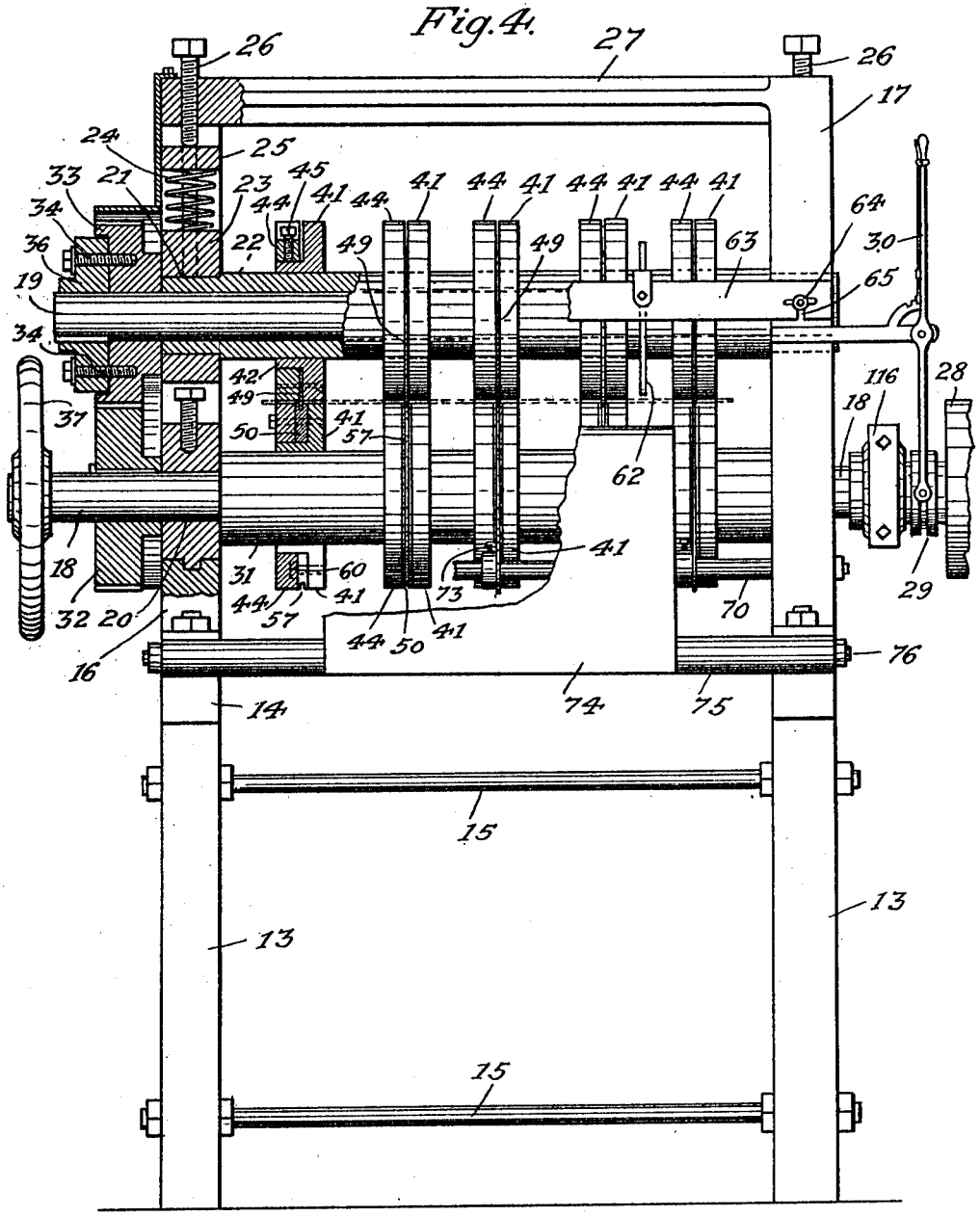

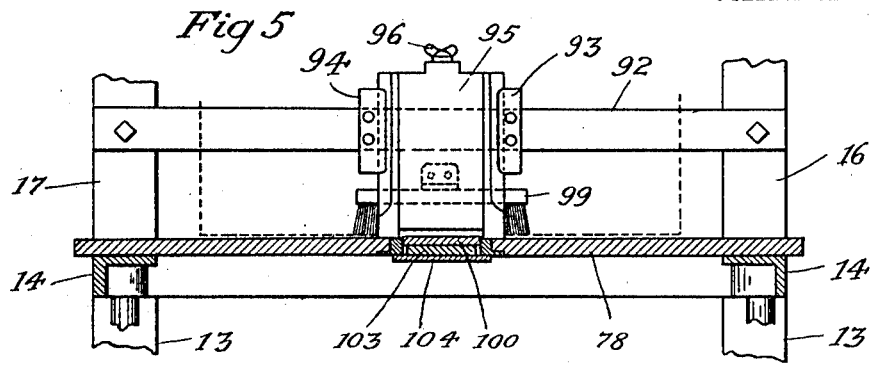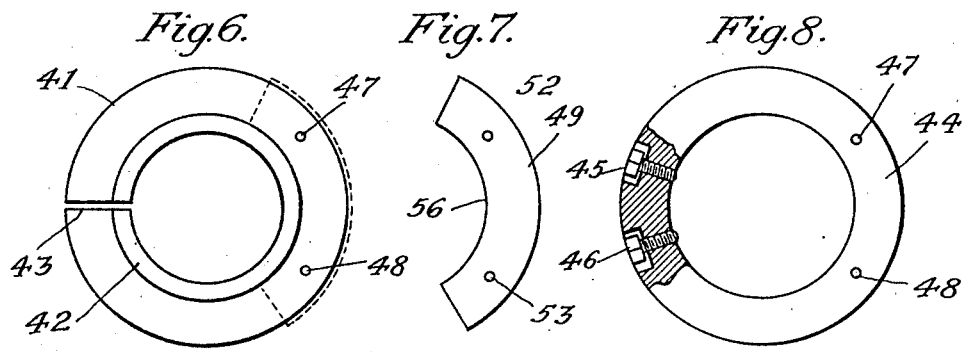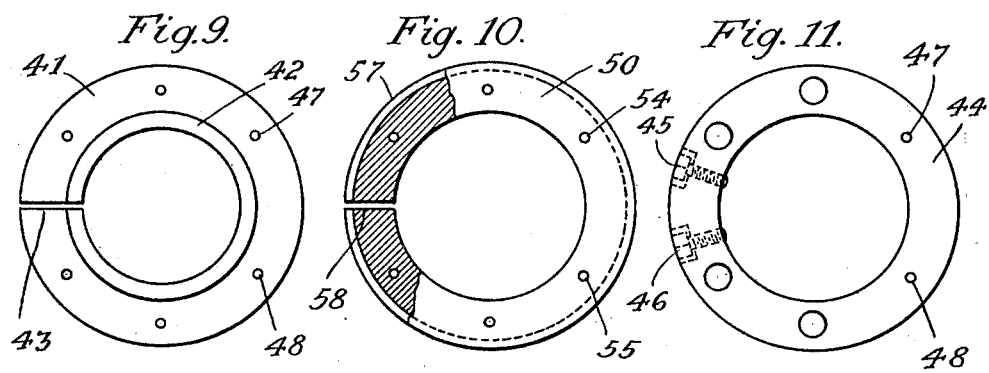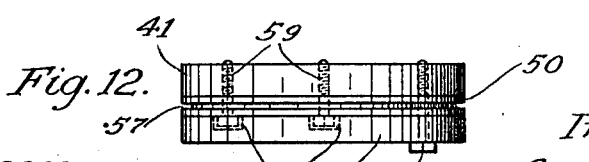

GEORGE A. FISHER AND JOHN A. MORRISON, OF MINNEAPOLIS, MINNESOTA, ASSIGNORS TO FISHER PAPER BOX COMPANY, OF MINNEAPOLIS, MINNESOTA, A CORPORATION.

BLANK-SLOTTING MACHINE.

1,012,538.  Specification of Letters Patent.  Patented Dec. 19, 1911.

Application filed July 3, 1911. Serial No. 636,804.

*To all whom it may concern:*

Be it known that we, GEORGE A. FISHER and JOHN A. MORRISON, citizens of the United States, residing at Minneapolis, in the county of Hennepin and State of Minnesota, have invented certain new and useful Improvements in Blank-Slotting Machines, of which the following is a specification.

Our invention relates to a machine for slotting blanks of paste board used in the making of egg cases and for other analogous purposes, and has for its object to provide such a machine in which the blanks will be fed and delivered entirely automatically, the slots cut simultaneously by members operating with a progressive shearing action together with means for adjusting the machine to cut slots of different lengths and differently spaced apart, as desired.

The full objects and advantages of our invention will appear in connection with the detailed description thereof and are particularly pointed out in the claims.

In the drawings illustrating the application of our invention in one form,—Figure 1 is a plan view of a machine embodying our invention. Fig. 2 is a side elevation. Fig. 3 is a sectional elevation corresponding to Fig. 1. Fig. 4 is an end elevation partly in section. Fig. 5 is a sectional view taken through the feeding table just back of the adjustable gate. Figs. 6 to 12, inclusive, are detail views of the double disks for holding the slot-cutting members.

A main supporting frame is composed of legs 13 and longitudinal frame members 14 secured in fixed parallel relation by means of cross rods 15. Upon the frame members 14 at either side of the machine are bolted heavy upright castings 16 and 17 provided with bearings for shafts 18 and 19 mounted in a common vertical plane, the bearings for shaft 18 being ordinary closed bearings, as shown at 20 in Fig. 4, while the bearings 21 for shaft 19 and for a sleeve 22 fast on said shaft 19 are closed at the top by a cap 23 pressed down by a spiral spring 24 positioned between cap 23 and a block 25, against which abuts the end of a screw bolt 26 threaded into the tops of castings 16 and 17 by which the force exerted by the spring upon bearing blocks 23 may be regulated. If desired, the castings 16 and 17 may be united at the lower ends thereof by a cross bar 27 which may, as shown, be cast directly with the members 16 and 17. The lower shaft 18 extends outside of the castings 17, having thereon a loose pulley 28 connected with a source of power by common means and a clutch 29 splined to the shaft and operated by means of a lever 30 to cause the shaft 18 to rotate with pulley 28 or not, as desired. Between the castings 16 and 17 shaft 18 has fast thereon a long sleeve 31, and outside of casting 16 a spur gear 32 is fast on shaft 18 meshing with a spur gear 33 which is loose on shaft 19 and is adjustably secured to rotate with shaft 19 by means of bolts 34 extending into gear 33 and through slots 35 in a disk 36 fast on shaft 19. The shaft 18 also has on the end thereof outside of gear 32 a hand wheel 37. By loosening bolts 34 and turning hand wheel 37 the position of gear 33 relative to sleeve 22 may be varied for the purpose of increasing or decreasing the length of cutting action of the slotting members hereafter to be described, the pointer 38 on gear 33 indicating upon the scale 39 or disk 36 the exact length of slot to be cut for any given relative position of gear 33 and sleeve 22.

Sleeves 31 and 22 are of the same diameter and have uninterrupted peripheral surfaces excepting for a guide line 40 running longitudinally on the surface of each of said sleeves. The slotting elements are mounted upon these sleeves, those on sleeve 22 comprising protruding knives and those on sleeve 31 the die seats or members between which the knives operate coöperating with the edges thereof to produce the slots. Each of these slotting elements comprises a pair of disk-like rings of the same outer peripheral diameter, one of said rings 41 having a sleeve-like flange 42 with an inner diameter substantially that of the sleeves 31 and 22 and being cut across or transversely split, as shown at 43. The other of said ring disks 44 is completely closed and has an inner peripheral diameter adapted to register over the sleeve 42. In the member 44 are a pair of set screws 45 and 46, extending through the same and adapted to impinge upon flange 42 when ring 44 is assembled thereon. All of rings 41 and 44 on both sleeves are provided with a pair of holes 47 and 48, the holes in the ring 41 being spaced apart and symmetrically disposed at a point opposite the cleft 43 while the holes 47 and 48 in ring 44 are positioned opposite the set bolts 45 and 46 so that when the parts are assembled the set bolts 45 and 46 will bear upon flange 42 close to and on either side of cleft 43, as clearly shown in Fig. 3. By screwing up upon the set bolts 45 and 46 the flange 42 may be made to clamp the sleeve 22 or the sleeve 31 with its entire inner peripheral surface with the result that the members 41 and parts secured thereto will be rigidly held upon either sleeve 22 or sleeve 31.

The protruding knives 49, as shown in detail in Figs. 6, 7, and 8, and the circular die-seat knives 50, as shown in Figs. 10 to 12, inclusive, are each provided with holes 52 and 53, and 54 and 55, respectively, corresponding in distance apart and size to the holes 47 and 48 in the rings 41 and 44, by means of which said knives are fixedly secured between rings 41 and 44, knife 49 being a segment of a ring with an inner peripheral surface 56 formed on an arc having the same radius as that of the exterior periphery of the flange 42 while knife 50 is ring-shaped with an inner periphery of the same size as the outer periphery of flange 42. The knife 50 is of the same exterior diameter as ring 44 and is formed with a centrally disposed peripheral groove 57 and is cut across, as shown at 58. It is additionally secured to ring 41 by bolts 59 extending through knife 50 and disk 41 and having the heads thereof received in depressions 60 in the inner face of disk 44, as shown in Figs. 11 and 12, knife 50 thus being secured to ring 41 with cut-away portions 58 and 43 juxtaposed but being secured to disk 44 only by long bolts 61 passing through holes 47 and 48 in disks 41 and 44 and holes 54 and 55 in the knife itself. By these means the cutting elements are rigidly and firmly secured to the rotating sleeves 22 and 31 yet are free to be adjusted to any extent desired along said sleeves. In positioning the cutting elements the cross slots 43 of the disks 41 will always be positioned over the line 40 on sleeves 31 and 22 and this line may, if desired, be provided with a scale by means of which the distance apart of the different pairs of ring disks 41 and 44 may be regulated to cut slits separated from one another any desired distance. Adjustment of the members on sleeve 31 and sleeve 22 will, of course, be such that the rings 41 and 44 on sleeve 22 will come directly over rings 41 and 44 on sleeve 31, protruding knives 49 between the upper pairs of rings of course operating to enter slots 57 in the circular die knives 50, as shown in Fig. 3. If it is desired to dispense with the operation of any of the coöperating pairs of slotting members one or the other of such members may be moved on its sleeve 31 or 22 to bring it out of engagement with the other member in which position it will be inoperative during operation of the machine.

To strip the blanks from the upper set of rollers after knives 49 have been thrust therethrough to form the slots, a series of incurved fingers 62 are adjustably mounted upon a cross-bar 63 removably secured to castings 16 and 17 by means of thumb screw 64 entering a slot 65 in the bottom of said bars. The members 62 may be bent tines of steel or other metal and are secured to bifurcated carriers 66 by means of a set screw 67, said carriers riding upon bar 63 and being secured thereto in any desired position of adjustment by set screw 68. Two or more of the stripping fingers 62 may be used, as desired, and will, of course, be positioned to extend between pairs of upper rollers, as shown.

To strip the kerf of cardboard removed by the knives 61 and thereby forced within groove 57 tongue-like members 69 are adjustably secured upon a rod 70 rigidly secured in and extending between castings 16 and 17. Said members are formed of thin strips of metal of a thickness adapting the same to enter the slots 57 of the die-knives and are provided with a curved or beveled end 71 the point of which engages the bottom of said slot so that as the kerf is brought along by the roller the end thereof will ride up on the member 69 and be thereby stripped from slots 57. Members 69 are formed with sleeves 72 which are secured to rod 70 by set screws 73. A receiving board 74 is secured upon a sleeve 75 mounted on a rod 76 carried by eyebolts 77 secured to frame members 14. The board 74 may be rotated into the position shown in dotted lines in Fig. 3 where it will be entirely out of the way. The stripping member 69 may also be rotated on stationary rod 70 by loosening set screws 73, and they may, of course, be adjusted along said rod to correspond with adjustments made on sleeve 31 of the slotting members.

A feed table 78 is supported by standards 79 extending upwardly from frame members 14. Upon this table are adjustably secured end guides 80 and 81 and a side guide or compressor 82 for holding the blanks in position to be fed through the machine, the adjustment of these members being provided for by extending the shanks 83, 84 and 85 carrying the same, through guide brackets 86, 87, 88 on the table 78, in which are set screws 89, 90 and 91, respectively, for holding the parts where set. A cross-bar 92 is secured to the front side of castings 16 and 17 and is provided with transverse ways 93 and 94 in which slides a gate 95, said gate being held in any desired position of adjustment by means of a thumb screw 96 rotatably mounted in a rearwardly extending lug 97 on the back of gate 95 and threaded into a lug 98 on the cross-bar 92. To the rear side of gate 96 is secured a brush 99 for resiliently holding the blanks firmly in contact with the table as the same are fed forward into the machine. By raising or lowering the gate 95 blanks of different thicknesses may be fed through the machine. Also, it is practicable with this machine to feed two or more blanks at each stroke of the pusher.

The pusher comprises a member 100 adapted to slide in a way 101 formed in the top of table 78, said member having a square front edge 102 extending the desired amount above the surface of table 78 to engage one or more blanks according to the thickness thereof. Member 100 is rigidly secured to a slide 103 having secured to the under side thereof a plate 104 extending beyond the sides of the aforesaid way, as best shown in Fig. 5. A pivot bolt 105 is mounted centrally in member 103 extending through plate 104, to the lower end of which is pivotally connected at 106 a link 107 which is pivotally connected to the long arm of a lever 111 mounted on a rock shaft 108 adjustably mounted in bearings 109, 110 in the table 78 and frame member 14, respectively. The short arm of the lever 111 is connected by universal joint 112 with a link 113 pivotally connected at 114 with a rod 115 on an eccentric 116 mounted on shaft 18.

In operation, after the adjustments of the slotting elements on sleeves 22 and 31 have been made for cutting slots of the proper depth and spaced apart the proper extent the machine is clutched to the source of power by means of lever 30. At each revolution of shaft 18 pusher 100 will be operated to force one or more of the blanks between the sets of slotting devices on sleeves 22 and 31. The outer peripheral surfaces of rings or rollers 41 and 44 will seize the blanks and at the same time the protruding knives 61 coöperating with the outer edges of the grooves 57 will begin to cut out a strip of material from the cardboard blank. The cutting is effected by a clean and continuously progressing shearing action and removes the kerf of cardboard leaving an absolutely clean edge at either side of the slot formed thereby. The length of the slot will be determined by the position of the sleeve 22 relative to the shaft 18 and more particularly the eccentric 116 thereon, which position is readily adjusted through the rotation of gear 33 on shaft 19 by the means already described. The termination of the slot is made as clearly as its beginning and always occurs when the rear end 117 of protruding knife 49 reaches cutting position in groove 57, as indicated in Fig. 3. The slotted blanks are then stripped from the series of cutters on sleeve 22 by the fingers 62, while the kerfs removed from the blanks are stripped from the slots 57 by fingers 69, the blank being thrown out on board 74 from which it will slide to any convenient receptacle or receiving means.

For certain classes of work it is sometimes desirable to arrange a series of the rotary slotting devices successively in a single machine. This may happen when it is proposed to cut a series of slots more closely positioned with respect to one another than is possible where all the slotting devices are on a single set of shafts. By arranging the sets of slotting devices on the successive sets of shafts in staggered or off-setting relation it is possible to cut a series of slots as close together as may be desired, even to the extent of forming a fringe-like border upon the material being slotted. Such a use of our machine is contemplated by us and falls within the scope of our invention.

We claim:

1. A machine for slotting blanks comprising sets of feeding rollers coöperating in superposed pairs, and sets of rotary shearing devices centrally mounted in said feed rollers and coöperating in pairs to cut the slots.

2. A machine for slotting blanks comprising sets of feeding rollers coöperating in superposed pairs, sets of rotary shearing devices centrally mounted in said feeding rollers and coöperating in pairs to cut the slots, and reciprocating means to feed said blanks singly and successively to said feeding rollers.

3. A machine for slotting blanks, comprising a drive shaft, a reciprocating feeder operatively connected thereto, a set of slotting devices on said shaft, a second shaft having thereon a second set of slotting devices coöperating with said first set, spur gears forming operative connection between said shafts, the gear on the second shaft being connected to the slotting means on said second shaft by a bolt and slot connection permitting relative adjustment thereof.

4. A machine for slotting blanks, comprising a drive shaft, a reciprocating feeder operatively connected thereto, a set of slotting devices on said shaft, a second shaft having thereon a second set of slotting devices coöperating with said first set, spur gears forming operative connection between said shafts, the gear on the second shaft being adjustable relatively to the slotting means on said second shaft, and being provided with a pointer and a scale rigid with said second slotting means coöperating with said pointer to indicate the length of slot for cutting which said slotting devices are set.

5. A machine for slotting blanks comprising two rotary members, and sets of rotary shearing devices mounted on said members and coöperating in pairs to cut the slots, each pair of said shearing devices comprising an integral double-shear-edged grooved ring removably mounted on one rotary member and a double-shear-edged knife on the other rotary member.

6. A machine for slotting blanks comprising two rotary members, sets of rotary shearing devices mounted on said members and coöperating in pairs to cut the slots, means to feed the blanks to said shearing devices, means for removing the blanks therefrom, and means for removing the kerf cut from the slots in the board from said shearing devices after the slots have been cut.

7. A machine for slotting blanks, comprising rotary members, shear holders adjustably secured to each of said members consisting of means to engage said rotary member at a number of points, and means for causing said engaging means to clamp said holders rigidly to the rotary member or for releasing the same to permit adjustment at will.

8. A machine for slotting blanks, comprising rotary members, shear holders adjustably secured to each of said members consisting of a split ring having a flanged base encircling said rotary member, a closed ring encircling said base, and set-screws in said closed ring bearing on said flanged portion of said split ring adjacent the split therein.

9. A machine for slotting blanks, comprising rotary members, shear holders adjustably secured to each of said members consisting of a split ring having a flanged base encircling said rotary member, a closed ring encircling said base, set-screws in said closed ring bearing on said flanged portion of said split ring adjacent the split therein, and a slot-cutting shear element secured between said rings.

10. A machine for slotting blanks, comprising rotary members, shear holders adjustably secured to each of said members consisting of a split ring having a flanged base encircling said rotary member, a closed ring encircling said base, set-screws in said closed ring bearing on said flanged portion of said split ring adjacent the split therein, and a slot-cutting shear element secured between said rings by means of bolts passing through both of said rings and said slotting element at points nearly opposite said split in the split ring.

11. A machine for slotting blanks, comprising rotary members, shear holders adjustably secured to each of said members consisting of a split ring having a flanged base encircling said rotary member, a closed ring encircling said base, set-screws in said closed ring bearing on said flanged portion of said split ring adjacent the split therein, a slot-cutting shear element secured between said rings by means of bolts passing through both of said rings and said slotting element at points nearly opposite said split in the split ring, and other bolts securing said slotting element to said split ring only at different points in the circumference thereof.

12. A machine for slotting blanks comprising two rotary members, sets of rotary shearing devices mounted on said members and coöperating in pairs to cut the slots, each pair of said shearing devices comprising a double-shear-edged grooved ring on one rotary member and a double-shear-edged knife on the other rotary member, and stationary members working in said grooves to remove the kerfs cut from the blank in slotting the same.

13. A machine for slotting blanks comprising two rotary members, sets of rotary shearing devices mounted on said members, and coöperating in pairs to cut the slots, each pair of said shearing devices comprising a double-shear-edged grooved ring on one rotary member and a double-shear-edged knife on the other rotary member, a shaft, and tongue-like members adjustably mounted on said shaft and having pointed ends adapted to be positioned so that said points will bear against the bottoms of said grooves and remove the kerfs cut from the blank in slotting the same.

In testimony whereof we affix our signatures in presence of two witnesses.

GEORGE A. FISHER.
JOHN A. MORRISON.

Witnesses:
  JENNIE B. MARXEN,
  OLIVER P. DUTTON.